United States Patent [19]

Duprez

[11] Patent Number: 4,537,346
[45] Date of Patent: Aug. 27, 1985

[54] FAIL-SAFE OIL FLOW CONTROL APPARATUS

[75] Inventor: Wayne R. Duprez, Waltham, Mass.

[73] Assignee: Standard-Thomson Corporation, Waltham, Mass.

[21] Appl. No.: 542,522

[22] Filed: Oct. 17, 1983

[51] Int. Cl.$^4$ ................................................. F01P 7/16
[52] U.S. Cl. ..................... 236/34.5; 137/72; 236/DIG. 2
[58] Field of Search ............... 236/34, 34.5, 92 C, 236/DIG. 2; 137/72, 625.48

[56] References Cited

U.S. PATENT DOCUMENTS

| | | | |
|---|---|---|---|
| 2,396,138 | 3/1946 | Vernet | 236/34 X |
| 2,400,911 | 5/1946 | Booth | 236/34.5 |
| 2,419,630 | 4/1947 | Cruzan et al. | 236/34.5 |
| 2,837,285 | 6/1958 | Urban | 236/34.5 |
| 2,919,860 | 1/1960 | Wagner | 236/34.5 |
| 3,291,216 | 12/1966 | Merrill | 137/72 X |
| 3,554,440 | 1/1971 | Austin et al. | 236/34.5 |
| 3,913,831 | 10/1975 | Talak | 236/34.5 |
| 4,344,564 | 8/1982 | Magnuson | 236/34.5 |
| 4,469,275 | 9/1984 | DeSalve | 236/DIG. 2 |

*Primary Examiner*—William E. Tapolcai
*Attorney, Agent, or Firm*—Jacox & Meckstroth

[57] ABSTRACT

Fail-safe oil flow control apparatus of this invention includes a thermally responsive actuator for operation of a valve member to control oil flow through a heat exchanger in accordance with the oil temperature conditions which exist. The apparatus also includes resilient members which operate to control operation of the valve member in accordance with the oil pressure conditions which exist. The apparatus also includes a fusible body which melts and permits operation of the valve member when excessive temperatures exist in the apparatus.

6 Claims, 6 Drawing Figures

FAIL-SAFE OIL FLOW CONTROL APPARATUS

BACKGROUND OF THE INVENTION

With regard to many types of engines, particularly, with regard to large diesel engines, the temperature of the lubricating oil should be maintained within a given range. Such temperature limitations are necessary to protect the engine and to avoid break-down of the oil. In order to cool the oil, a heat exchanger is provided through which the oil flows.

To protect the heat exchanger from excessive oil pressures, a bypass conduit is employed in the oil circulation system. Pressure control means are employed to control flow of the oil through the bypass conduit.

It is an object of this invention to provide oil flow control apparatus which directs oil flow to a heat exchanger only when the temperature of the oil is above a predetermined value.

It is another object of this invention to provide such oil flow control apparatus which directs oil flow through a conduit which bypasses the heat exchanger when the oil pressure exceeds a predetermined value, regardless of the temperature of the oil.

Another object of this invention is to provide such oil flow control apparatus which automatically directs oil flow through a heat exchanger if the the oil flow control apparatus should fail to function properly in accordance with the temperature of the oil.

Other objects and advantages of this invention reside in the construction of parts, the combination thereof, the method of production, and the mode of operation, as will become more apparent from the following description.

SUMMARY OF THE INVENTION

The oil flow control apparatus of this invention comprises a housing which is adapted to be mounted within an oil flow conduit system of an internal combustion engine. The conduit system has a passage for receiving oil from a pump and a passage for directing oil to the engine and a passage for directing oil to a heat exchanger. A thermally responsive actuator is located within the housing and is operably connected to a movable valve member for movement thereof. The valve member is movable to control flow of oil from the pump to the heat exchanger and to the engine. The oil flow control apparatus of this invention also includes fail-safe structure so that the apparatus fails safe when temperature and/or pressure conditions become excessive.

DESCRIPTION OF THE PREFERRED EMBODIMENT OF THE INVENTION

Figure 1:
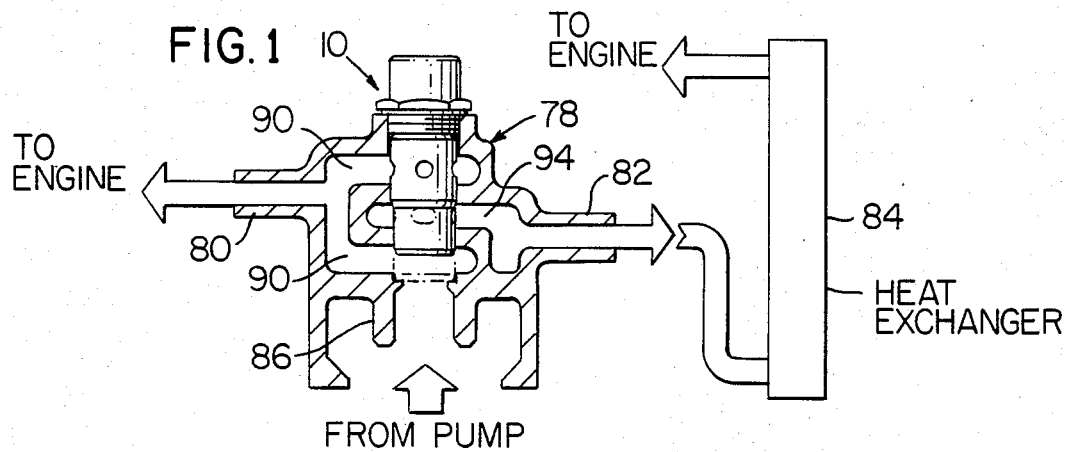
FIG. 1 is a diagrammatic view illustrating an oil flow conduit system in an internal combustion engine system with oil flow control apparatus of this invention within the oil flow conduit system.

Oil flow control apparatus of this invention comprises a housing 10 provided with a cup-shape cap 12. Rigidly attached to the cap 12 and extending therefrom is a tubular wall 14, provided with openings or ports 18 therein. Within the housing 10, and encompassed by the tubular wall 14 is a thermally responsive actuator 24, which is insensitive to pressure and which may consist of any suitable structure, such as that disclosed in U.S. Pat. Nos. 2,806,375 and 2,806,376. The thermally responsive actuator 24 includes an actuator rod 26. The thermally responsive actuator 24 is clamped by a connector member 30 at the lower end of the connector member 30. The actuator 24 extends from the connector member 30. The connector member 30 extends upwardly from the actuator member 24 and, at least partially, encloses an abutment member 34. The abutment member 34 is provided with a socket 36 in the upper end thereof. Positioned within the socket 36 is a coil spring assembly 40 which engages the abutment member 34 and an internal surface of the cap 12. The upper end of the abutment member 34 is provided with an annular flange 42. Within the cap 12 and attached thereto is a ring 46. In engagement with the ring 46 on the upper surface thereof is an annular disc assembly 48. Between the disc assembly 48 and the flange 42 of the abutment member 34 is an annular body 50 of fusible material. The body 50 of fusible material limits downward movement of the abutment member 34. The actuator rod 26 abuttingly engages the lower surface of the abutment member 34.

The upper portion of the connector member 30 has an annular flange 52. The flange 52 is normally urged into engagement with the lower surface of the ring 46 by a coil spring 56, which encompasses the connector member 30. The coil spring 56 at the lower portion thereof engages an annular disc 60, which is in engagement with a ring 62 which is attached to the inner surface of the cap 12.

The actuator 24 has rigidly attached thereto a piston 66. Secured to the piston 66 is a sleeve valve 70 which has an engagement end 72. The sleeve valve 70 has a plurality of openings or ports 74 therein.

The housing 10 is adapted to be mounted within an oil flow conduit unit 78. The cap 12 is shown threadedly attached to the conduit unit 78 for positioning the housing 10 within the conduit unit 78. A sealing member 79 is shown positioned between the cap 12 and the oil conduit unit 78. The oil conduit unit 78 includes a conduit 80 leading to an engine, not shown, with which the conduit unit 78 is associated. The conduit unit 78 includes a conduit 82 which leads to a heat exchanger 84. The conduit unit 78 includes an inlet conduit 86 which leads from an oil pump, not shown, which may be a part of the engine. Within the conduit unit 78 and encompassing the conduit 86 is a valve seat 88.

The housing 10 is mounted and positioned in the conduit unit 78 in a manner such that the openings 18 in the tubular wall 14 are in fluid communication with a passage 90 which is in fluid communication with the conduit 80 which leads to the engine. The passage 90 is also normally in communication with the conduit 86 which leads from the oil pump. The conduit 82 of the conduit unit 78 has a passage 94 therein which is in fluid communication with the conduit 82 which leads to the heat exchanger 84.

OPERATION

Figure 2:
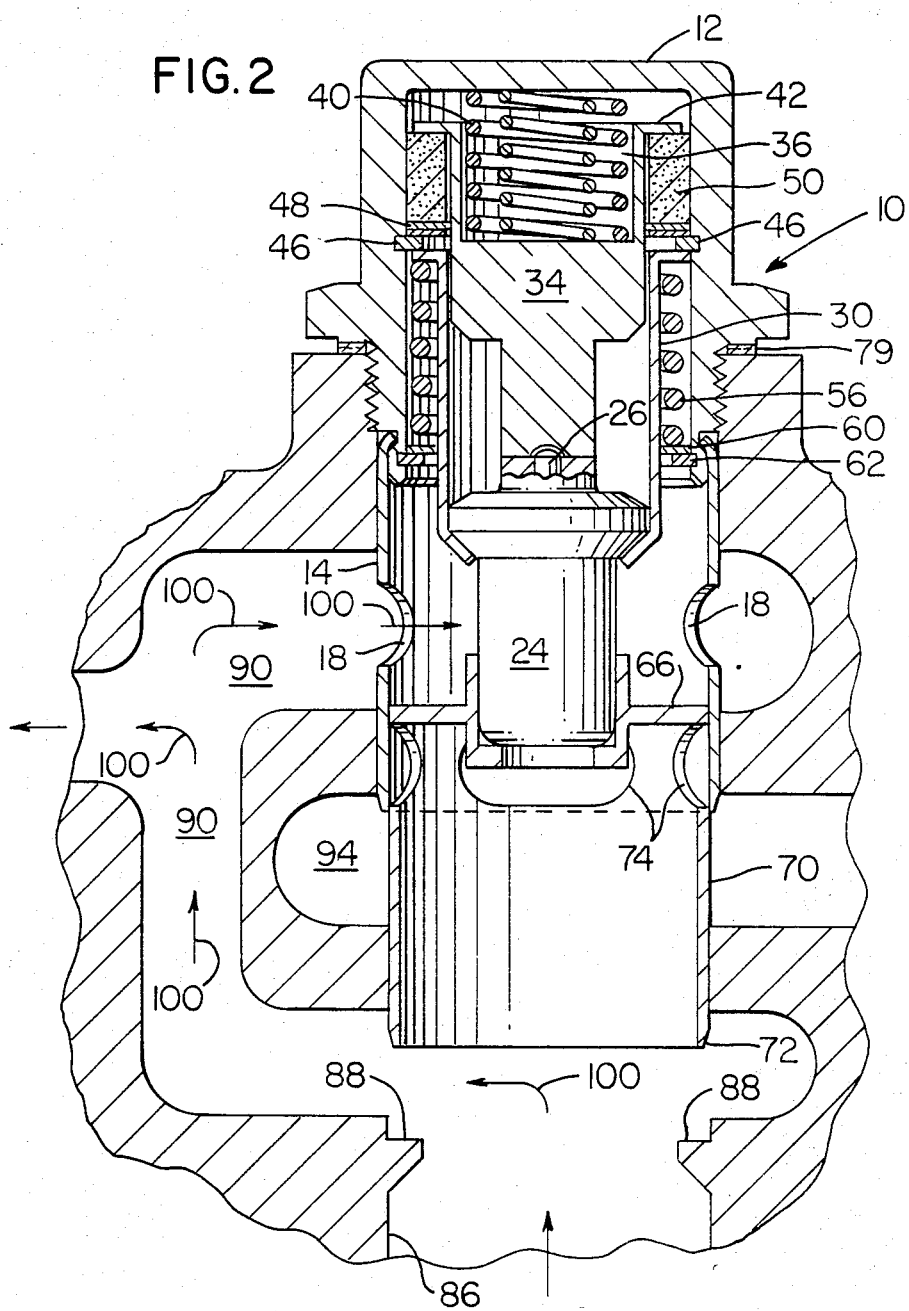
FIG. 2 is a sectional view, drawn on a much larger scale than FIG. 1, showing a portion of the oil flow conduit system and illustrating oil flow control apparatus of this invention in one operating condition thereof.

When the engine, with which the conduit unit 78 is associated, begins operation the lubricating oil pumped through the engine is relatively cool. The oil flows into the conduit unit 78 through the conduit 86. The oil flows through the conduit 86 into the passage 90, as illustrated by arrows 100 in FIG. 2. Some of the oil flowing in the passage 90 flows through the ports 18 and engages the thermally responsive actuator 24. Some of the oil also flows into the sleeve valve 70 and engages the lower portion of the actuator 24. Due to the fact that the temperature of the oil which engages the actuator 24 is below a predetermined temperature, the actuator 24 remains in a de-actuated condition, as illustrated in FIG. 2. Thus, the sleeve valve 70 remains positioned as illustrated in FIG. 2, and all the oil flowing into the conduit unit 78 flows into the passage 90 and outwardly through the conduit 80. The openings or ports 74 in the sleeve valve 70 are closed by the wall 14, and none of the oil flowing into the conduit unit 78 is permitted to flow into the passage 94 which leads to the conduit 82 and to the heat exchanger 84.

Figure 3:
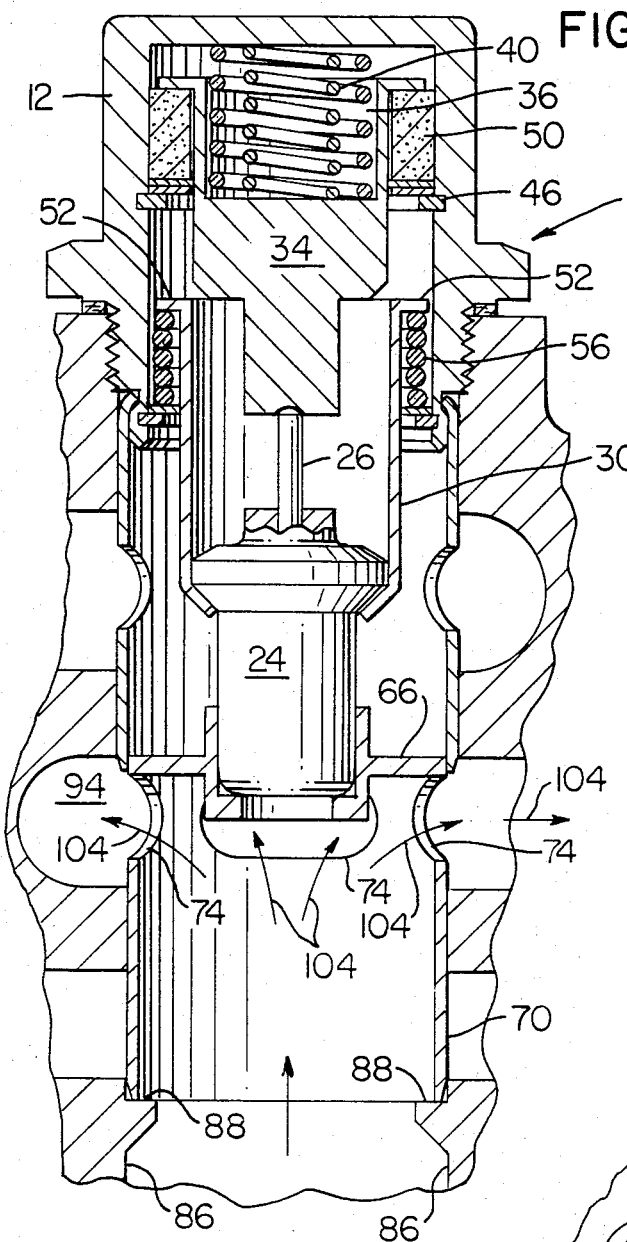
FIG. 3 is a sectional view similar to FIG. 2 but illustrating the oil flow control apparatus in another operating condition thereof.

After the engine has operated for a period of time, the lubricating oil flowing through the engine and through the conduit unit 78 becomes heated. Some of the oil flowing in the conduit unit 78 engages the thermally responsive actuator 24. When the temperature of the oil engaging the actuator 24 reaches a given predetermined value, there is relative movement between the actuator 24 and the actuator rod 26, as illustrated in FIG. 3. Due to the fact that the spring 56 exerts a lesser force than the spring assembly 40, the abutment member 34 and the actuator rod 26 remain relatively stationary. Thus, the actuator 24 moves downwardly and moves the connector member 30 downwardly. As the flange 52 of the connector member 30 moves downwardly, the spring 56 is forced into greater compression, as illustrated in FIG. 3.

When the actuator 24 moves downwardly, as illustrated in FIG. 3, the actuator 24 moves the piston 66 and sleeve valve 70 downwardly. The engagement portion 72 of the sleeve valve 70 engages the valve seat 88, as illustrated in FIG. 3. When the engagement portion 72 of the sleeve valve 70 engages the valve seat 88 as illustrated in FIG. 3, the openings 74 of the sleeve valve 70 are in communication with the passage 94. In the position of the sleeve valve 70 illustrated in FIG. 3, some of the oil flowing in the conduit unit 78 and through the sleeve valve 70 engages the lower end portion of the actuator 24 and maintains the actuator 24 in a heated and actuated condition, as shown in FIG. 3. Thus, all the oil flowing into the conduit 86 flows into the passage 94 through the openings 74, as illustrated by arrows 104 in FIG. 3. The oil flows from the passage 94 into the conduit 82 and then flows to the heat exchanger 84. The oil flows through the heat exchanger 84 and back to the engine for lubrication thereof.

Figure 4:
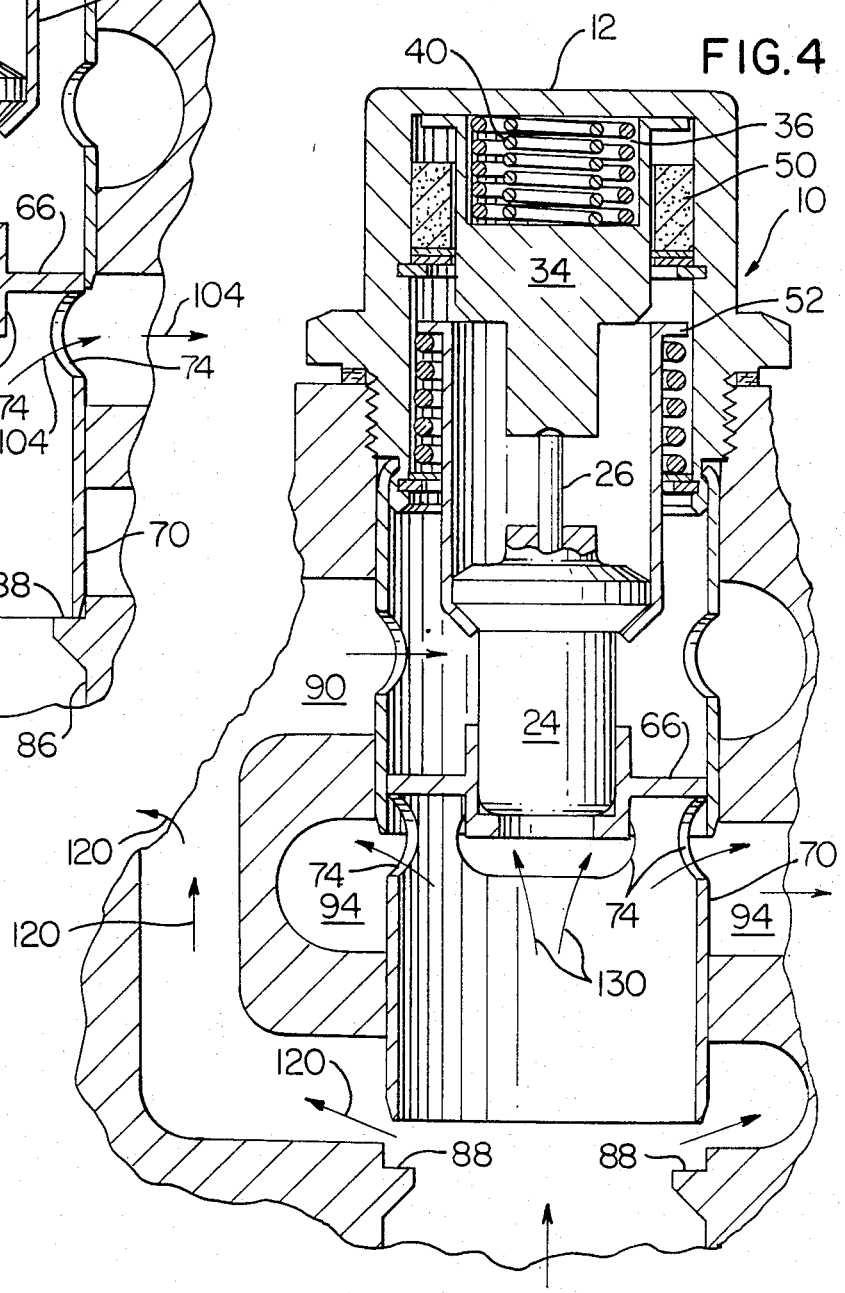
FIG. 4 is a sectional view similar to FIGS. 2 and 3 but illustrating the oil flow control apparatus in still another operating condition thereof.

A special situation may occur while the oil flowing in the conduit unit 78 is in a heated condition and while all the oil flows from the conduit unit 78 to the heat exchanger 84. A blockage or restriction may occur in the heat exchanger 84. This blockage or restriction blocks or greatly restricts flow of oil through the heat exchanger 84. If such an event occurs, the pressure of the oil upon the piston 66 becomes so great that the oil pressure forces the piston 66 upwardly within the housing 10, as illustrated in FIG. 4. When the piston 66 is forced upwardly the sleeve valve 70 is forced upwardly, away from the valve seat 88, as illustrated in FIG. 4.

When the sleeve valve 70 moves from the valve seat 88, oil flow to the passage 90 is permitted, as illustrated by arrows 120 in FIG. 4. Thus, at least some of the oil flowing into the conduit unit 78 through the conduit 86 flows through the passage 90 and outwardly from the conduit unit 78 through the conduit 80 and returns to the engine, without passing through the heat exchanger 84. As shown in FIG. 4, the oil pressure upon the piston 66 may move the sleeve valve 70 only slightly from the valve seat 88. FIG. 4 also shows some of the oil flowing through the ports 74 in the sleeve valve 70 and into the passage 94 for flow to the heat exchanger 84, as illustrated by arrows 130 in FIG. 4. Therefore, while oil flow to the passage 90 occurs, oil flow through the openings 74 to the passage 94 also occurs. If the oil pressure upon the piston 66 becomes greater, the sleeve valve 70 may be moved upwardly to such an extent that the ports 74 are closed and all of the oil flows through the passage 90 and conduit 82 to the engine.

Figure 5:
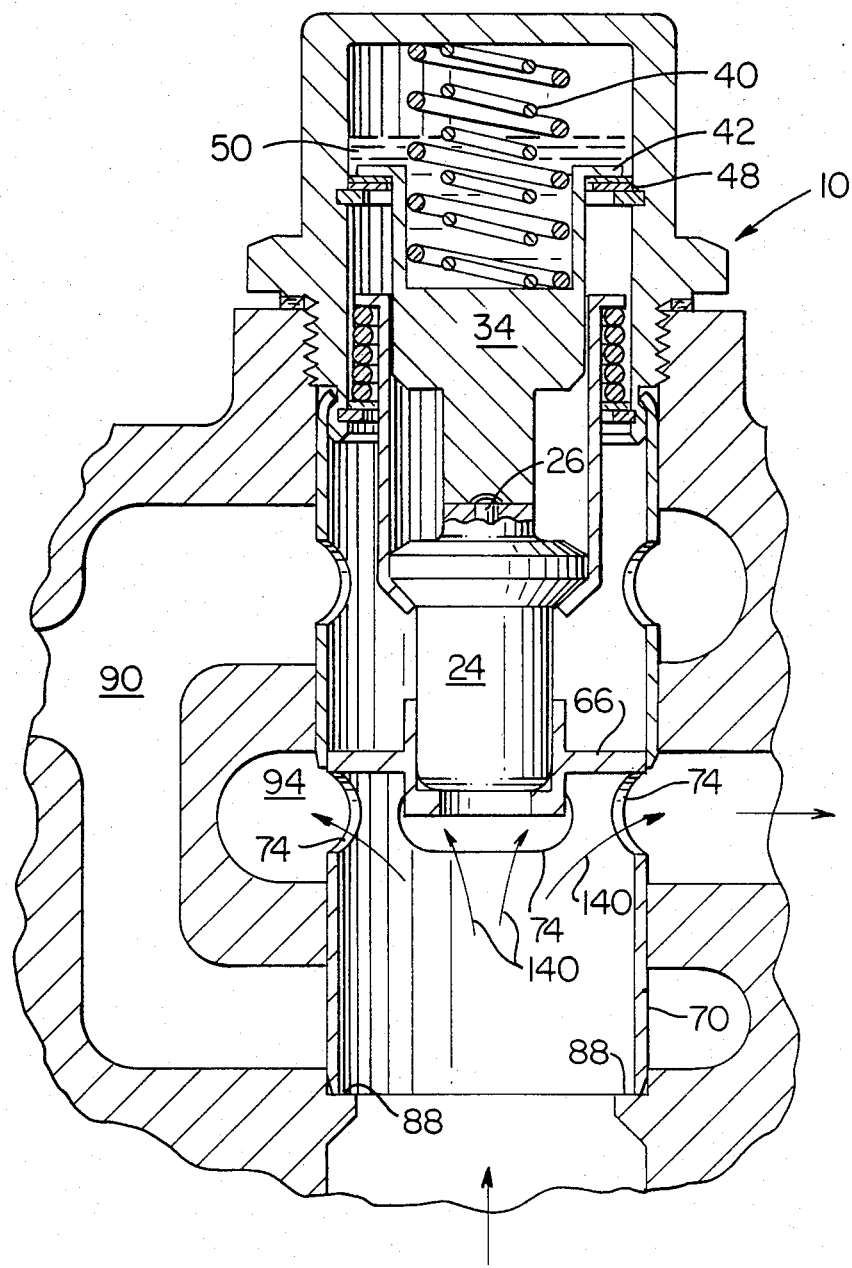
FIG. 5 is a sectional view similar to FIGS. 2, 3, and 4 and illustrating the oil flow control apparatus in still another operating condition thereof.

Another type of situation may occur with regard to oil flow through the conduit unit 78. The thermally responsive actuator 24 may fail and become non-functional even though oil having a temperature above a predetermined value flows into engagement with the actuator 24. When this occurs, there is not relative movement between the actuator 24 and the actuator rod 26. The actuator 24 does not move, to move the sleeve valve 70. When this failure situation occurs, the sleeve valve 70 remains spaced above the valve seat 88, and all of the oil flows to the passage 90 and returns to the engine, without flow through the heat exchanger 84. However, of course, when the temperature of the oil flowing in the conduit unit 78 is high, at least some of the oil should flow through the passage 94 and to the heat exchanger 84. If the thermally responsive actuator 24 fails to function, and if the temperature in the conduit unit 78 exceeds a predetermined value, heat in the conduit unit 78 heats the body 50 of fusible material and the body 50 of fusible material melts. When this occurs the spring assembly 40 forces the abutment member 34 downwardly until the flange 42 engages the discs 48, as illustrated in FIG. 5. Downward movement of the abutment member 34 forces the actuator 24 downwardly, which forces the piston 66 and the sleeve valve 70 downwardly. Thus, the sleeve valve 70 is moved into engagement with the valve seat 88, and oil flow to the passage 90 is prevented. Thus, all of the oil flow occurs through the ports 74 of the sleeve valve 70 and into the passage 94, as illustrated by arrows 140 in FIG. 5. Thus all of the oil flows through the conduit 82 to the heat exchanger 84.

Figure 6:
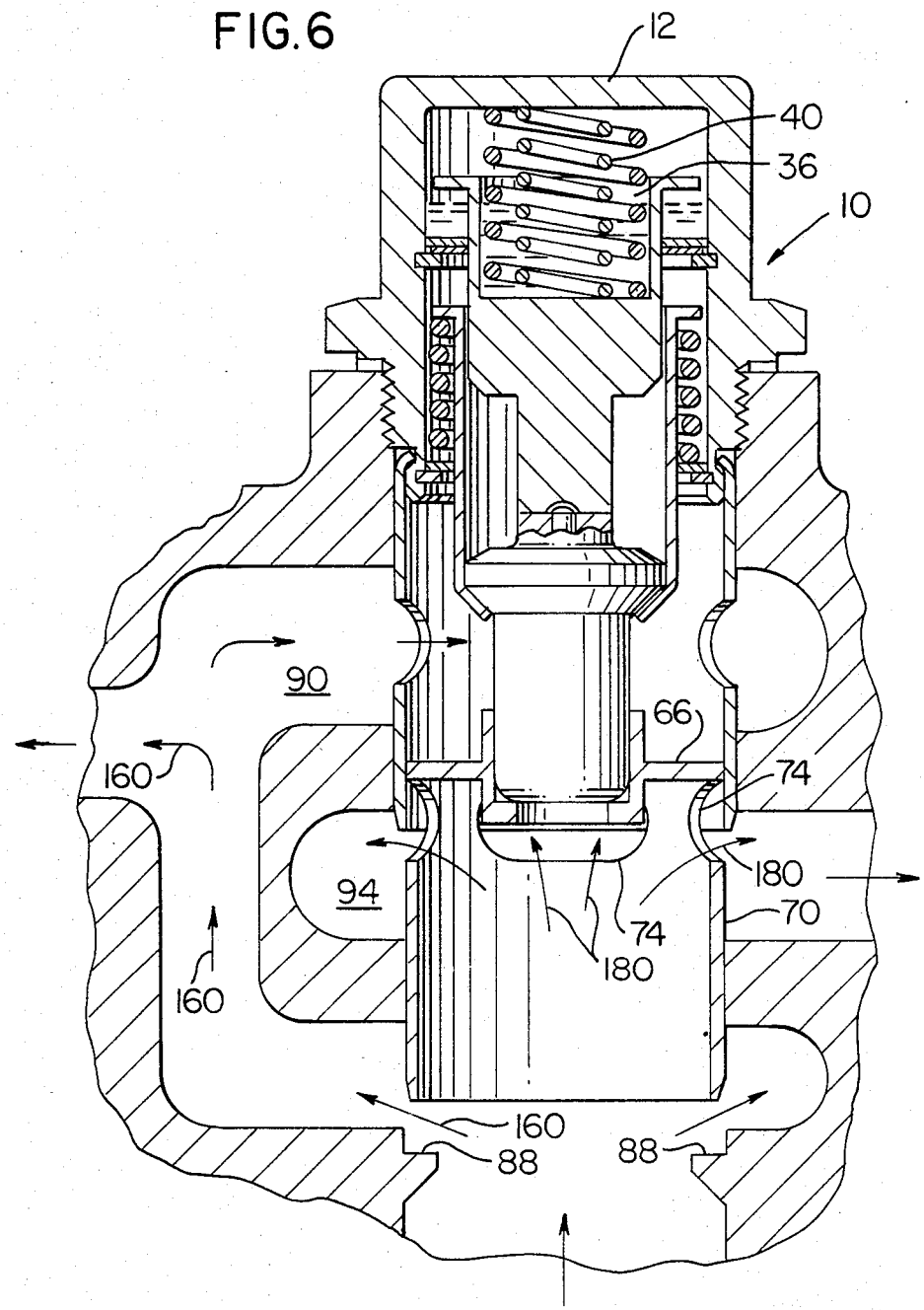
FIG. 6 is a sectional view similar to FIGS. 2, 3, 4, and 5 and illustrating the oil flow control apparatus in still another operating condition thereof.

If the oil pressure conditions in the conduit unit 78 should become excessive after the body 50 of fusible material melts, the oil pressure upon the piston 66 forces the sleeve valve 70 upwardly, from the position of the sleeve valve 70 shown in FIG. 5, to the position of the sleeve valve 70 shown in FIG. 6. When this occurs, oil flows to the passage 90 as illustrated by arrows 160 in FIG. 6 and flows through the conduit 80, back to the engine.

As shown in FIG. 6, the magnitude of the oil pressure upon the piston 66 may permit the sleeve valve 70 to be positioned as shown in FIG. 6 so that some of the oil flows through the ports 74 in the sleeve valve 70, as illustrated by arrows 180 in FIG. 6, and into the passage 94 for flow to the heat exchanger 84.

Thus, it is understood that the oil flow control apparatus of this invention properly controls flow of engine lubricating oil under any condition which may exist.

Furthermore, the oil flow control apparatus of this invention fails safe under conditions of excessive oil temperature and/or under conditions of excessive oil pressure.

Although the preferred embodiment of the fail safe oil flow control apparatus of this invention has been described, it will be understood that within the purview of this invention various changes may be made in the form, details, proportion and arrangement of parts, the combination thereof, and the mode of operation, which generally stated consist in a structure within the scope of the appended claims.

The invention having thus been described, the following is claimed:

1. Oil flow control apparatus adapted to be positioned within an internal combustion engine system having an engine, a heat exchanger, a conduit system and a fluid pump for forcing oil flow through the conduit system to the heat exchanger and to the engine, the conduit system having an outlet passage leading to the engine and an outlet passage leading to the heat exchanger and an inlet passage leading from the fluid pump, the inlet passage being encompassed by a valve seat, the conduit system having a connecting passage leading from the inlet passage to the outlet passage which leads to the engine, comprising:
    a housing provided with an enclosing wall having an opening therethrough for communication between the housing and the outlet passage which leads to the engine,
    a piston slidably movable within the housing,
    a sleeve valve attached to the piston and movable therewith to engage the valve seat to close the connecting passage, the sleeve valve being movable from the valve seat to open the connecting passage, the sleeve valve having a port therein, the sleeve valve being movable to position the port therein in communication with the outlet passage which leads to the heat exchanger for flow of fluid from the inlet passage, through the sleeve valve and through the port to the heat exchanger,
    a thermally responsive actuator within the housing,
    means attaching the thermally responsive actuator to the piston for movement of the piston with movement of the actuator,
    a connector member within the housing,
    means joining the connector member to the thermally responsive actuator,
    a first spring member, the first spring member having a portion fixedly positioned within the housing and a portion in engagement with the connector member for urging movement of the connector member and the actuator away from the valve seat,
    an abutment member movably positioned within the housing,
    means operably joining the abutment member to the thermally responsive actuator for simultaneous movement of the actuator and the abutment member,
    a second spring member, the second spring member being within the housing and in engagement with the abutment member and urging movement of the abutment member and the actuator toward the valve seat, the thermally responsive actuator moving the piston and the sleeve valve with respect to the abutment member and with respect to the valve seat, excessive pressure of fluid within the sleeve valve forcing movement of the piston and the sleeve valve in a direction away from the valve seat.

2. Oil flow control apparatus adapted to be positioned within an internal combustion engine system having an engine, a heat exchanger, a conduit system and a fluid pump for forcing oil flow through the conduit system to the heat exchanger and to the engine, the conduit system having a passage leading to the engine and a passage leading to the heat exchanger and an inlet passage leading from the fluid pump, the inlet passage being encompassed by a valve seat, the conduit system having a connecting passage leading from the inlet passage to the passage which leads to the engine, comprising:
    a housing having communication with the passage which leads to the engine,
    a piston slidably movable within the housing,
    a sleeve valve attached to the piston and movable therewith to engage the valve seat to close the connecting passage, the sleeve valve being movable from the valve seat to open the connecting passage, the sleeve valve having a port therein, the sleeve valve being movable to position the port therein in communication with the passage which leads to the heat exchanger for flow of fluid from the inlet passage, through the sleeve valve and through the port to the heat exchanger,
    a thermally responsive actuator within the housing,
    means attaching the thermally responsive actuator to the piston for movement of the piston with movement of the actuator,
    a connector member within the housing,
    means joining the connector member to the thermally responsive actuator,
    a first spring member, the first spring member having a portion fixedly positioned within the housing and a portion in engagement with the connector member for urging movement of the connector member and the actuator away from the valve seat,
    an abutment member movably positioned within the housing,
    means operably joining the abutment member to the thermally responsive actuator for simultaneous movement of the actuator and the abutment member,
    a second spring member, the second spring member being within the housing and in engagement with the abutment member and urging movement of the abutment member and the actuator toward the valve seat, the thermally responsive actuator moving the piston and the sleeve valve with respect to the abutment member and with respect to the valve seat, excessive pressure of fluid within the sleeve valve forcing movement of the piston and the sleeve valve in a direction away from the valve seat,
    a body of fusible material fixedly positioned within the housing and positioning the abutment member within the housing and normally restraining movement of the abutment member toward the valve seat, the body of fusible material being meltable to permit the second spring member to move the abutment member and the actuator and the sleeve valve toward the valve seat.

3. Oil flow control apparatus adapted to be positioned within an internal combustion engine system having an engine, a heat exchanger, a conduit system and a fluid pump for forcing oil flow through the conduit system to the engine and to the heat exchanger, the conduit system having an inlet passage leading from the fluid pump and a passage leading to the engine and a passage leading to the heat exchanger, the conduit system also having a connecting passage leading from the inlet passage to the passage which leads to the engine, a valve seat encompassing the inlet passage, comprising:

a housing having communication with the passage which leads to the engine,
a cylindrical valve member movable within the housing and extending therefrom, the cylindrical valve member including a transverse wall which is subject to fluid pressure in the inlet passage, the cylindrical valve member being movable to engage the valve seat to close communication between the connecting passage and the inlet passage, the valve member being movable from the valve seat to open communication between the connecting passage and the inlet passage, the valve member having a port therein, the valve member being movable to position the port in communication with the passage which leads to the heat exchanger for flow of fluid from the inlet passage through the valve member and through the port to the heat exchanger,
a thermally responsive actuator within the housing, the thermally responsive actuator having a first portion and a second portion, the first and second portions of the thermally responsive actuator being relatively movable with operation of the thermally responsive actuator,
means attaching the first portion of the thermally responsive actuator to the valve member for simultaneous movement of the valve member and the first portion of the actuator member,
a first spring member,
means joining the first spring member to the valve member for urging movement of the valve member with respect to the valve seat,
a second spring member,
means joining the second spring member to the valve member for urging movement of the valve member with respect to the valve seat,
the apparatus being so constructed that during normal operation of the apparatus the thermally responsive actuator member moves the valve member with respect to the valve seat when the temperature of the apparatus is above a predetermined value, the apparatus being so constructed that pressure of fluid upon the transverse wall urges movement of the valve member with respect to the valve seat,
a body of fusible material within the housing and positioned to normally restrain the second spring member from movement of the valve member with respect to the valve seat, the body of fusible material being meltable upon subjection to excessive temperatures to release the second spring member to permit the second spring member to move the valve member with respect the valve seat.

4. The apparatus of claim 3 in which the first spring member urges the valve member in a direction away from the valve seat and in which the second spring member urges the valve member toward the valve seat.

5. The apparatus of claim 3 in which the thermally responsive actuator moves the valve member toward the valve seat when the temperature of the apparatus is above a predetermined value.

6. The apparatus of claim 3 in which pressure of fluid upon the transverse wall urges the valve member in a direction away from the valve seat.

* * * * *